US012596763B2

(12) United States Patent
Ramachandran et al.

(10) Patent No.: US 12,596,763 B2
(45) Date of Patent: Apr. 7, 2026

(54) REDUCED LATENCY CONTENT PREFETCHING WITH LOCAL BEHAVIORAL PROFILES

(71) Applicant: Palo Alto Networks, Inc., Santa Clara, CA (US)

(72) Inventors: Ganapathy Subramanian Ramachandran, Santa Clara, CA (US); Rosarin Jolly Roy Antonyraj, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/782,432

(22) Filed: Jul. 24, 2024

(65) Prior Publication Data

US 2026/0030313 A1     Jan. 29, 2026

(51) Int. Cl.
G06F 16/957 (2019.01)

(52) U.S. Cl.
CPC ................................ G06F 16/9574 (2019.01)

(58) Field of Classification Search
CPC .................................................... G06F 16/9574
See application file for complete search history.

(56) References Cited

U.S. PATENT DOCUMENTS

| | | | | |
|---|---|---|---|---|
| 8,516,114 B2 * | 8/2013 | Banavar | ................ | H04L 67/306 709/225 |
| 9,747,384 B1 * | 8/2017 | Rao | ....................... | G06F 16/972 |
| 10,033,692 B1 * | 7/2018 | Vavrusa | .................. | H04L 61/59 |
| 10,261,938 B1 * | 4/2019 | Jenkins | ............... | G06F 16/9574 |
| 2006/0277271 A1 * | 12/2006 | Morse | ................. | H04L 67/5681 709/227 |
| 2020/0004889 A1 * | 1/2020 | Mathur | ............... | G06F 16/9574 |
| 2020/0160229 A1 * | 5/2020 | Atcheson | ............... | G06N 20/00 |
| 2021/0333957 A1 * | 10/2021 | Golan | .................. | G06F 3/0481 |

OTHER PUBLICATIONS

"Control Azure Content Delivery Network caching behavior with caching rules", [online], [retrieved on Jul. 25, 2024] Retrieved from the Internet: <https://learn.microsoft.com/en-us/azure/cdn/cdn-caching-rules>, Mar. 21, 2024.

* cited by examiner

*Primary Examiner* — Edward J Dudek, Jr.
(74) *Attorney, Agent, or Firm* — Gilliam IP PLLC

(57) ABSTRACT

The present disclosure relates to migrating behavioral profiles for prefetching website content at proxy servers in content delivery networks (CDNs) from the proxy servers to corresponding endpoint devices. When an endpoint device communicates a request for a website, that request is routed to a proxy server of a CDN. The proxy server responds to the endpoint device with an indication of a web server that stores an extension comprising a behavioral profile for the website. The endpoint device retrieves the extension from the web server and loads the extension in an isolated computing environment using a web browser plugin or other extension of the web browser. The behavioral profile is then used to inform prefetching of content of the website by the plugin based on behavior of the web browser.

20 Claims, 7 Drawing Sheets

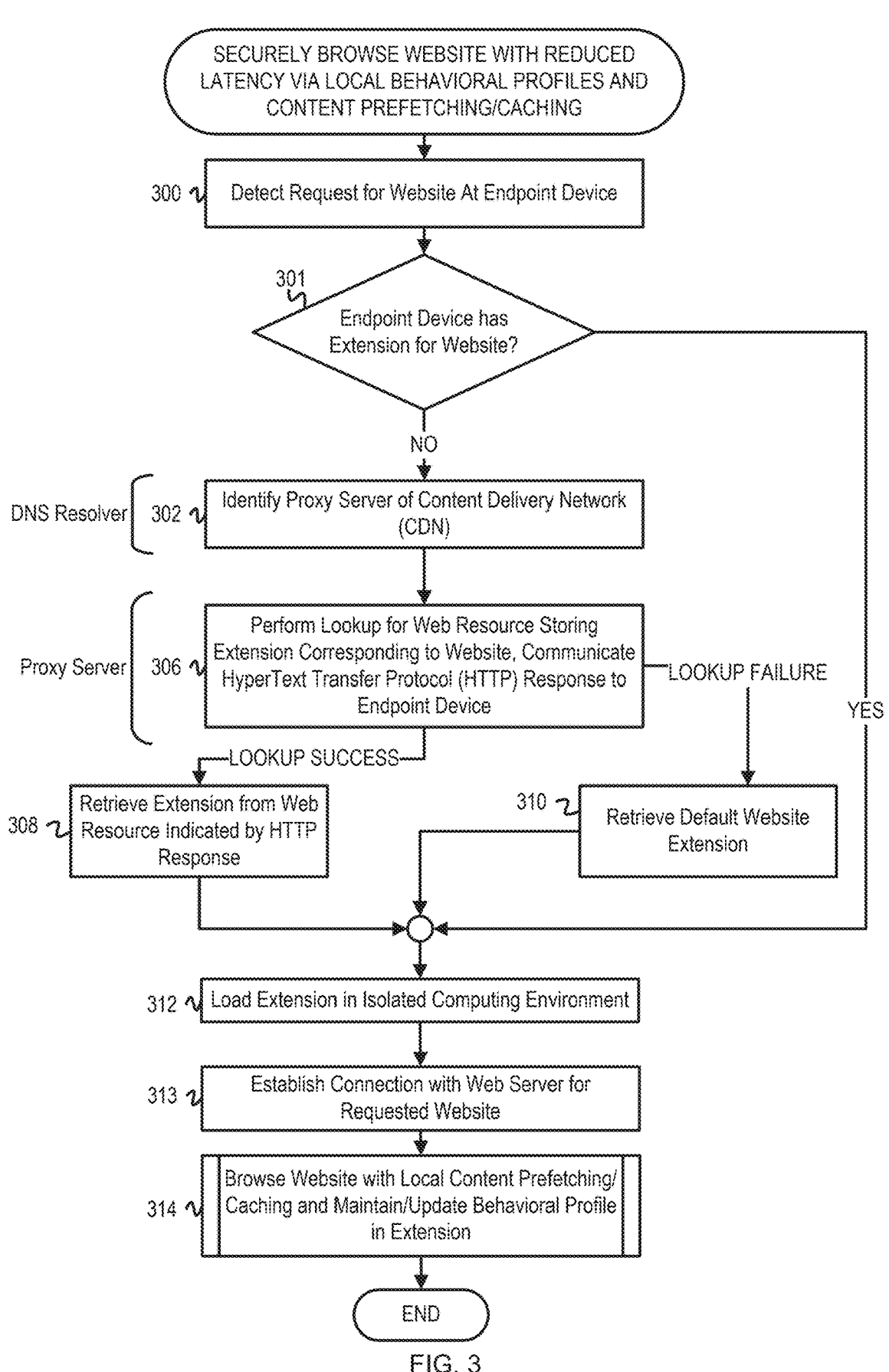

SECURELY BROWSE WEBSITE WITH REDUCED LATENCY VIA LOCAL BEHAVIORAL PROFILES AND CONTENT PREFETCHING/CACHING

300 — Detect Request for Website At Endpoint Device

301 — Endpoint Device has Extension for Website?

NO

DNS Resolver { 302 — Identify Proxy Server of Content Delivery Network (CDN)

Proxy Server { 306 — Perform Lookup for Web Resource Storing Extension Corresponding to Website, Communicate HyperText Transfer Protocol (HTTP) Response to Endpoint Device

LOOKUP FAILURE

YES

—LOOKUP SUCCESS—

308 — Retrieve Extension from Web Resource Indicated by HTTP Response

310 — Retrieve Default Website Extension

312 — Load Extension in Isolated Computing Environment

313 — Establish Connection with Web Server for Requested Website

314 — Browse Website with Local Content Prefetching/ Caching and Maintain/Update Behavioral Profile in Extension

END

FIG. 3

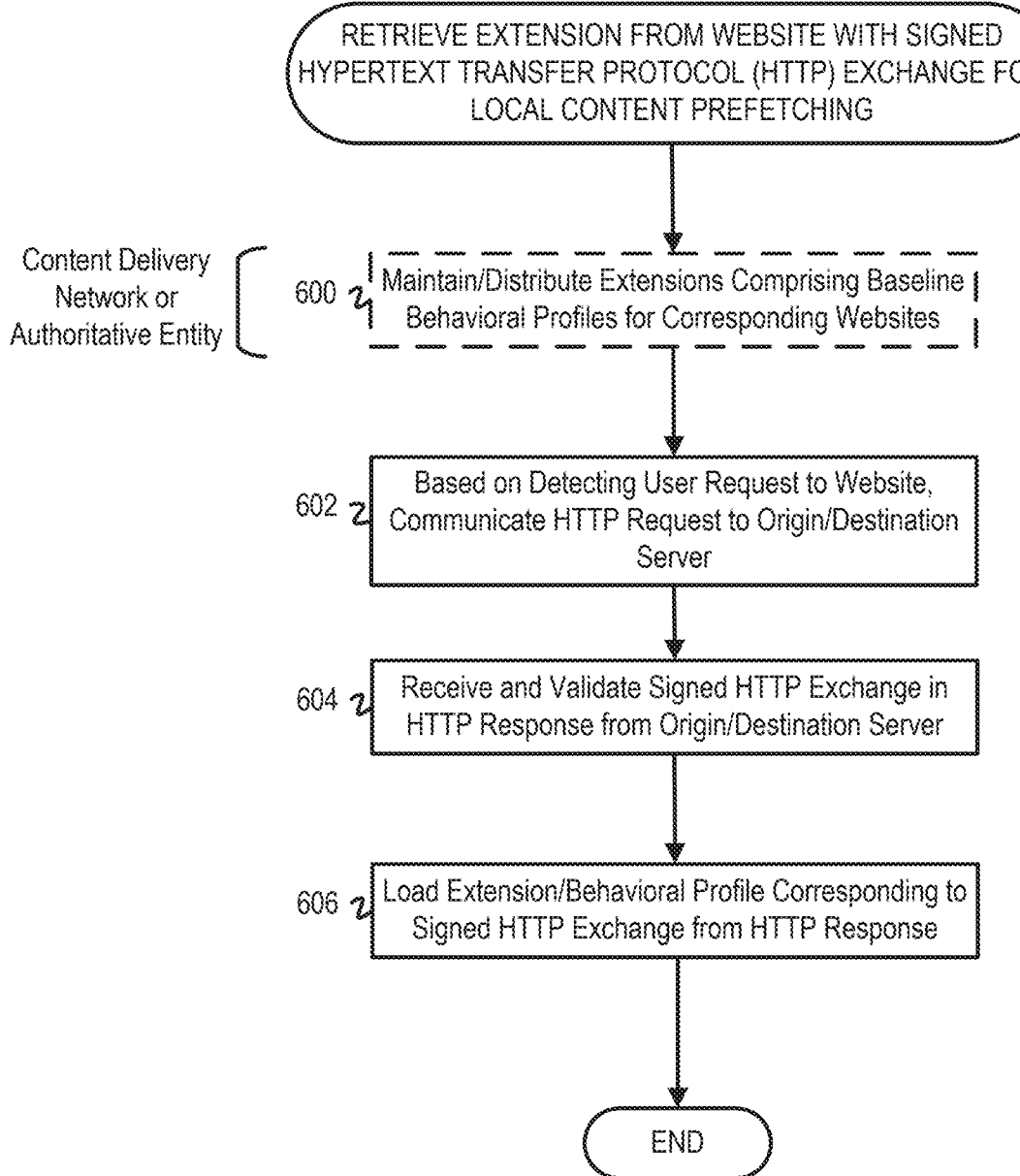

RETRIEVE EXTENSION FROM WEBSITE WITH SIGNED HYPERTEXT TRANSFER PROTOCOL (HTTP) EXCHANGE FOR LOCAL CONTENT PREFETCHING

Content Delivery Network or Authoritative Entity

600 — Maintain/Distribute Extensions Comprising Baseline Behavioral Profiles for Corresponding Websites 602 — Based on Detecting User Request to Website, Communicate HTTP Request to Origin/Destination Server 604 — Receive and Validate Signed HTTP Exchange in HTTP Response from Origin/Destination Server 606 — Load Extension/Behavioral Profile Corresponding to Signed HTTP Exchange from HTTP Response

END

FIG. 6

REDUCED LATENCY CONTENT PREFETCHING WITH LOCAL BEHAVIORAL PROFILES

BACKGROUND

The disclosure generally relates to transmission of digital information (e.g., CPC class H04L) and to arrangements for administration or management of switching networks (e.g., CPC subclass H04L 41/00).

A Content Delivery Network (CDN) is a system of proxy servers that enhances the performance, reliability, and security of delivering web content, such as webpages, images, and videos, by caching and serving it from servers located closer to users. CDNs work by caching copies of content on multiple servers around the world, which reduces latency and load times when users request a webpage, as the content is served from the nearest server. They also use load balancing to distribute traffic across servers, preventing any single server from becoming overwhelmed and ensuring better performance and availability. The geographic distribution of servers allows CDNs to serve content more quickly to users regardless of their location. Additionally, CDNs optimize content by compressing files like images and videos to reduce file sizes and improve delivery speeds.

BRIEF DESCRIPTION OF THE DRAWINGS

Embodiments of the disclosure may be better understood by referencing the accompanying drawings.

FIG. 3 is a flowchart of example operations for securely browsing a website with reduced latency via local behavioral profiles and content prefetching/caching.

FIG. 6 is a flowchart of example operations for retrieving an extension from a website with a signed HTTP exchange (SXG) for local content prefetching.

DESCRIPTION

Figure 1:
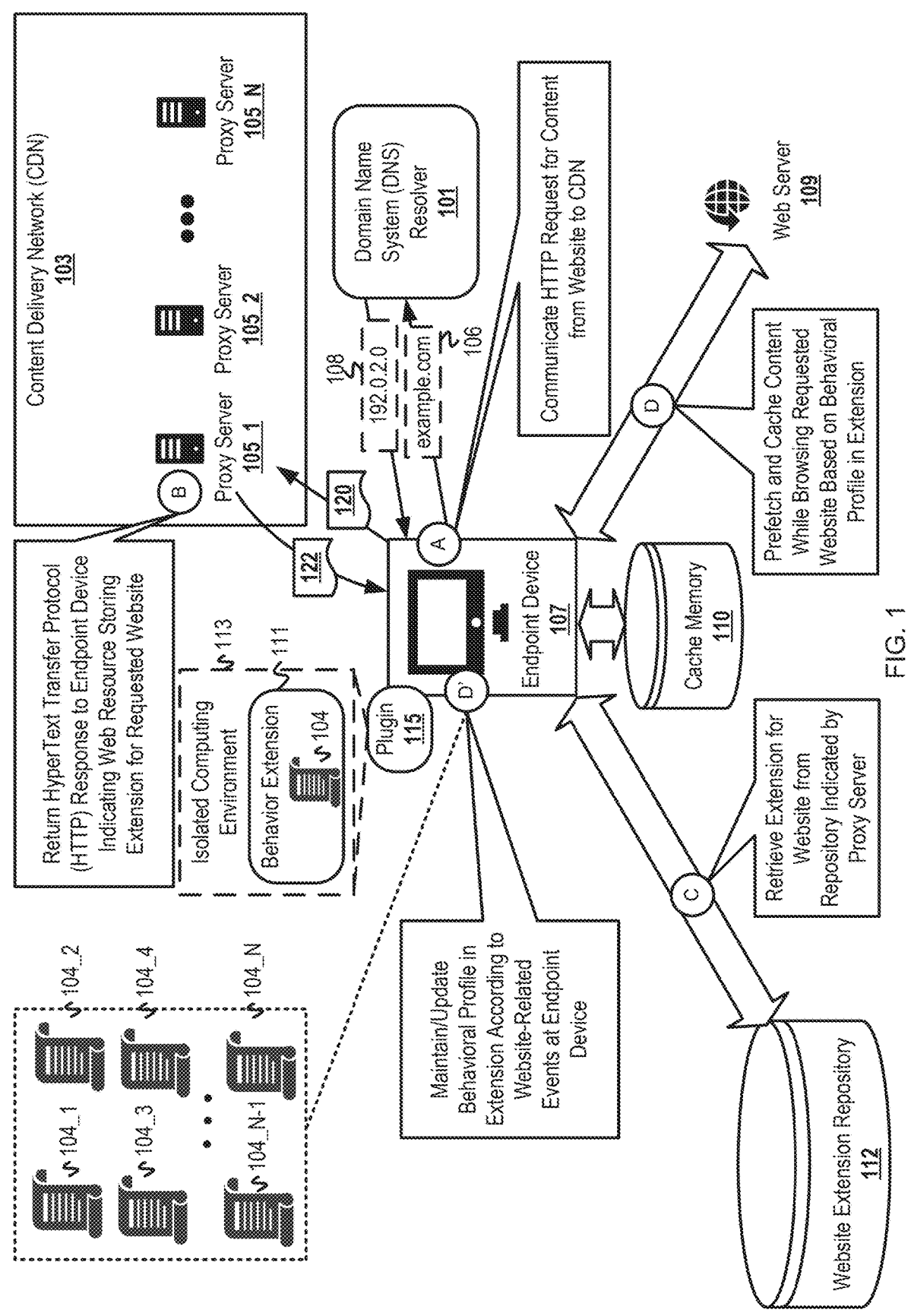
FIG. 1 is a schematic diagram of an example system for securely browsing a website with a local plugin that retrieves and maintains behavioral profiles for websites as part of a CDN.

The description that follows includes example systems, methods, techniques, and program flows to aid in understanding the disclosure and not to limit claim scope. Well-known instruction instances, protocols, structures, and techniques have not been shown in detail for conciseness.

Overview

Link prefetching is often augmented by behavioral profiles that inform which uniform resource locators (URLs) to prefetch in a website as a user is browsing. However, the behavioral profiles are typically maintained at proxy servers disparate to endpoint devices where users are browsing the website. Maintaining these behavioral profiles at the proxy servers represents a security risk because data for user behavior is communicated external to endpoint devices where the behavior occurs. Moreover, there is a latency when the proxy servers provide prefetched website content according to the behavioral profiles because, when a user navigates to a different web page, the endpoint device for the user has to submit a request to a proxy server and the proxy server then has to respond to the request which adds the latency between the endpoint device and the proxy server. As a large-scale issue, requests by the proxy servers can be rate limited when repeatedly crawling websites for prefetching of multiple users across multiple endpoint devices, because all of the prefetch requests are routed through the same proxy servers. The present disclosure proposes migrating maintenance of behavioral profiles from centralized proxy servers of CDNs to plugins running at the endpoint devices themselves. The maintenance of behavioral profiles as extensions of the plugins on endpoint devices is implemented in isolation (e.g., in an isolated environment) to enforce user privacy because the behavioral profiles never leave the endpoint devices.

When a plugin at an endpoint device that manages requests to the Internet (e.g., at a web browser) submits a request to a website that is managed by a CDN, that request is routed to a proxy server of the CDN. According to the present disclosure, the proxy server performs a lookup for a URL (or other identifier) of the website to determine whether there is an extension available for the website that comprises a baseline behavioral profile for expected behavior of users browsing the website. If an extension is available, the proxy server communicates a HyperText Transfer Protocol (HTTP) response to the endpoint device that indicates a web resource where the endpoint device can retrieve the extension. If no extension for the website is available, the proxy server communicates an HTTP response to the endpoint device indicating that there is no available extension, and the plugin initializes a generic behavioral profile for the website.

Subsequently, the plugin at the endpoint device (instead of the proxy server) establishes a connection with the website and prefetches content from the corresponding web server according to the behavioral profile in the extension; as a result, content is already locally stored in a cache at the endpoint device when the user requests a web page of the website. The plugin periodically updates the behavioral profile according to navigational patterns indicated by events occurring at the web browser, and stores the updated profiles for future use when a teardown of the connection with the website occurs. Running the plugin at the user's endpoint device improves privacy, reduces rate limiting, reduces Domain Name System (DNS) configuration, and resolves issues with language localization. Privacy is improved because the behavioral profiles are maintained by the plugin in isolation on the endpoint device. Latency that would otherwise occur when a separate proxy server is prefetching links is improved. Rate limiting is reduced because the prefetching occurs from each source Internet Protocol (IP) address per-endpoint device and not across endpoint devices at the proxy server. The need to configure Domain Name System (DNS) records or provision certificates through the proxy server is reduced. Issues with language localization when the proxy server is at a location with a different language than a native language for the endpoint device is reduced.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The term "plugin" as used herein refers to a software module that manages Internet communications (e.g., HTTP requests and HTTP responses) at an endpoint device by a web browser or other application requesting access to the Internet.

The term "behavior extension" as used herein refers to a software module maintained by a plugin that comprises a behavioral profile for behavior of a web browser or application when browsing a website.

Example Illustrations

FIG. 1 is a schematic diagram of an example system for securely browsing a website with a local plugin that retrieves and maintains behavioral profiles for websites as part of a CDN. A plugin 115 at an endpoint device 107 requests content from a website 106 having top-level domain "example.com". The website 106 corresponds to a web server 109 for which a content provider of the web server 109 has permitted a CDN 103 to prefetch and cache content of the website 106 to deliver to endpoint devices. A DNS resolver 101 receives a request for content of the website 106 from the endpoint device 107 and identifies Internet Protocol (IP) address 108 (192.0.2.0) of a proxy server 105_1 for the CDN 103 corresponding to the endpoint device 107. The endpoint device 107 then communicates an HTTP request 120 to the proxy server 105_1 then determines that the website 106 and/or endpoint device 107 supports local content prefetching/caching and performs a lookup to determine whether there is an existing extension having a user behavioral profile for the website 106. Based on determining that an extension exists, the proxy server 105_1 communicates an HTTP response 122 to the endpoint device 107 that indicates a website extension repository 112 having a behavior extension 111 for the website 106. The plugin 115 retrieves the behavior extension 111 from the website extension repository 112 and loads the behavior extension 111 in an isolated computing environment 113 that is isolated from other processes at the endpoint device 107. The plugin 115 then prefetches and caches content for the website 106 in cache memory 110 according to a behavioral profile 104 for the behavior extension 111. After session teardowns at the endpoint device 107, the plugin 115 updates/stores behavioral profiles for the corresponding websites in memory for retrieval when the websites are later requested. Each behavioral profile has a one-to-one correspondence to a website, although in some embodiments behavioral profiles can be maintained across multiple websites.

The operations in FIG. 1 assume that the website 106 is supported by the CDN 103 (for instance, that an administrator of the web server 109 has opted into a subscription or other service model for the CDN 103). The CDN 103 or other organization managing the CDN 103 maintains and updates extensions for corresponding websites in the website extension repository 112 for subsequent retrieval by endpoint devices at a centralized location (as opposed to having to store website extensions at each proxy server of the CDN 103). In some embodiments, administrators of the websites themselves can maintain baseline behavioral profiles to include in extensions for corresponding websites that they communicate to the CDN 103 and/or the website extension repository 112 as the behavioral profiles are generated/updated. For instance, the administrators can use behavioral data across all users of a website to maintain a baseline behavioral profile.

FIG. 1 is annotated with a series of letters A, B, C, D, D', and E. Each stage represents one or more operations. The operations at stages D and D' can occur in parallel, and some of the operations at stage D can occur in response to operations at stage D' and vice-versa. Although these stages are ordered for this example, the stages illustrate one example to aid in understanding this disclosure and should not be used to limit the claims. Subject matter falling within the scope of the claims can vary from what is illustrated.

At stage A, the plugin 115 communicates an identifier (e.g., URL) of the website 106 to the CDN 103. The DNS resolver 101 iteratively queries a hierarchy of nameservers with the top-level domain for the website 106 (receiving Internet Protocol (IP) addresses for each nameserver in the hierarchy in response) until it queries a nameserver for the CDN 103 (not depicted). The nameserver for the CDN 103 then determines an optimal proxy server from proxy servers 105_1, 105_2, . . . 105_N for the endpoint device 107. For instance, the nameserver for the CDN can use Anycast DNS to identify a proxy server that is geographically closest to the endpoint device 107. Additionally or alternatively, the nameserver for the CDN can use load balancing and other networking protocols when identifying the optimal proxy server. In the example depicted in FIG. 1, the nameserver for the CDN returns the IP address 108 for the proxy server 105_1 to the DNS resolver 101 and the DNS resolver 101 communicates the IP address 108 to the endpoint device 107. The endpoint device 107 then communicates the HTTP request 120 to the proxy server 105_1 using the IP address 108.

The plugin 115 can, prior to communicating the HTTP request 120, determine whether an extension exists in local memory (e.g., the cache memory 110). If an extension exists in local memory, the plugin 115 can omit the operations at stage A (which will subsequently skip the operations at stages B and C), and can immediately load the behavior extension 111 in the isolated computing environment 113 to subsequently prefetch and cache content for the website 106 according to the operations at stage D.

At stage B, the proxy server 105_1 performs a lookup to determine whether there is a web resource (i.e., the website extension repository 112 in the example depicted in FIG. 1) that is storing an extension for the website 106 and, based on determining that the plugin exists in storage at the web resource, communicates the HTTP response 122 to the endpoint device 107 that indicates the website extension repository 112 (e.g., a URL, URI, IP address, etc. of the website extension repository 112). For instance, the proxy server 105_1 can have an index of top-level domains of websites and corresponding web resources where the extensions are stored, and the proxy server 105_1 can search the index for the top-level domain "example.com" of the website 106. If the proxy server 105_1 determines that the behavior extension 111 is not available for the website 106

(e.g., the top-level domain of the website 106 is not in the index), the proxy server 105_1 communicates the HTTP response to the endpoint device 107 that instead indicates that an extension for the website 106 is not available. In some embodiments, the proxy server 105_1 can itself store/ cache extensions for websites supported by the CDN 103 and can return the behavior extension 111 corresponding to the website 106 to the endpoint device 107. This reduces the latency of retrieving extensions from the website repository 112.

At stage C, the plugin 115 retrieves the behavior extension 111 for the website 106 from the website extension repository 112. For instance, the plugin 115 can communicate an HTTP request that indicates an identifier of the top-level domain of the website 106 and the website extension repository 112 can return the behavior extension 111 in an HTTP response. Although the website extension repository 112 is described herein as a web resource that is accessed by the plugin 115 via the Internet, the storage location of extensions can vary by implementation. For instance, an organization (not depicted) associated with the endpoint device 107 can maintain the extensions for websites. The extensions can be maintained in storage at a local area network for the organization so that behavioral data for users stored in each extension/behavioral profile is not exposed to the Internet, reducing cybersecurity risk. Once retrieved, the plugin 115 loads the behavior extension 111 into the isolated computing environment 113.

Because the behavior extension 111 is running in the isolated computing environment 113, behavioral data for a user of the endpoint device 107 is not exposed to the Internet. For subsequent operations of browsing the website 106 and prefetching content, the only interaction with the behavioral profile 104 is the plugin 115 providing indications of user requests for web pages to the behavior extension 111 and the behavioral profile 104 returning web pages to prefetch content. The isolated computing environment 113 ensures that potentially malicious processes running at the endpoint device 107 do not have access to the behavioral profile 104.

In some embodiments, extensions stored by the plugin 115 will have version numbers. The plugin 115 can inspect the behavior extension 111 returned by the website extension repository 112 against an existing extension for the website 106 stored in local memory (e.g., the cache memory 110) at the endpoint device 107. If the existing extension has a lower version number than the behavior extension 111, then the plugin 115 can load the behavior extension 111 instead of the existing extension and can overwrite the existing extension with the behavior extension 111 in local memory.

At stage D, the plugin 115 prefetches and caches content while browsing the website 106 via the web server 109 based on a behavioral profile 104 in the behavior extension 111. The behavioral profile 104 can comprise rules-based and/or machine learning-based models that take requested URLs (or other web page identifiers) as input and output additional URLs to prefetch/cache. The range of outputs of the behavioral profile 104 is thus one or more URLs that are sub-domains of the top-level domain for the website 106. For instance, the behavioral profile 104 can be a regression model, random forest classifier, gradient boosting model, neural network, etc. whose output is a vector with each entry indicating a 0 (don't prefetch) or 1 (prefetch) for a URL corresponding to that entry. The input to the behavioral profile 104 can comprise a vector that indicates a requested URL for the website 106, which starts with the top-level domain "example.com" of the website 106 in the example in FIG. 1. The behavioral profile 104 can be trained on historical behavior patterns, i.e., sequences of requested web pages for the website 106.

The behavioral profile 104 can be additionally trained on events that occur at a web browser (or other application accessing the Internet) managed by the plugin 115 while a user browses the website 106. These events can include scrolling events and clicking events. The behavioral profile 104 can comprise a rules-based model that prefetches URLs that are likely to be clicked or scrolled to by users according to the historical user events. For instance, the historical user events can indicate that after searching at a web page of the website 106 (e.g., when the website 106 is an e-commerce website), the user is likely to click on one of the top-3 (or top-N) search results, and the behavioral profile 104 can indicate prefetching the top-3 search results. Likelihoods for URLs that are clicked or scrolled to by users can accordingly be updated according to these events during additional training. For instance, if a user frequently clicks on elements that occur at the top of a web page then URLs that are rendered close to the top of a web page can be boosted in likelihood in the behavioral profile 104.

The prefetching and caching of content from the web server 109 by the plugin 115 occurs as a user or application of the endpoint device 107 browses the website 106. Accordingly, when a user or application submits an HTTP request for a web page of the website 106, the plugin 115 searches cache memory 110 to determine whether the web page was already prefetched and, if the web page was prefetched, renders the web page in a web browser without communicating with the web server 109. Nonetheless, even if an HTTP request is not actually sent to the web server 109 because the content was already prefetched and stored in cache memory 110, that HTTP request can still be used by the behavioral profile 104 to identify additional URLs/web pages to prefetch.

At stage D', the plugin 115 maintains/updates the behavioral profile 104 in the behavior extension 111 according to website-related events that occur at the endpoint device 107 while browsing the website 106. For instance, the plugin 115 can use website-related events (e.g., web page request events, scrolling events, clicking events, etc.) as additional training data for the rules-based and/or machine learning-based models implemented by the behavioral profile 104. The plugin 115 can update the behavioral profile 104 as events occur at the endpoint device 107 and/or after a session teardown occurs between the website 106 and the endpoint device 107. The plugin 115 then stores the behavioral profiles for each website (e.g., behavioral profiles 104_1-104_N) in local memory. The local memory storage of behavioral profiles can have stringent access rights to prevent unwanted access by potentially malicious processes running at the endpoint device 107.

Figure 2:
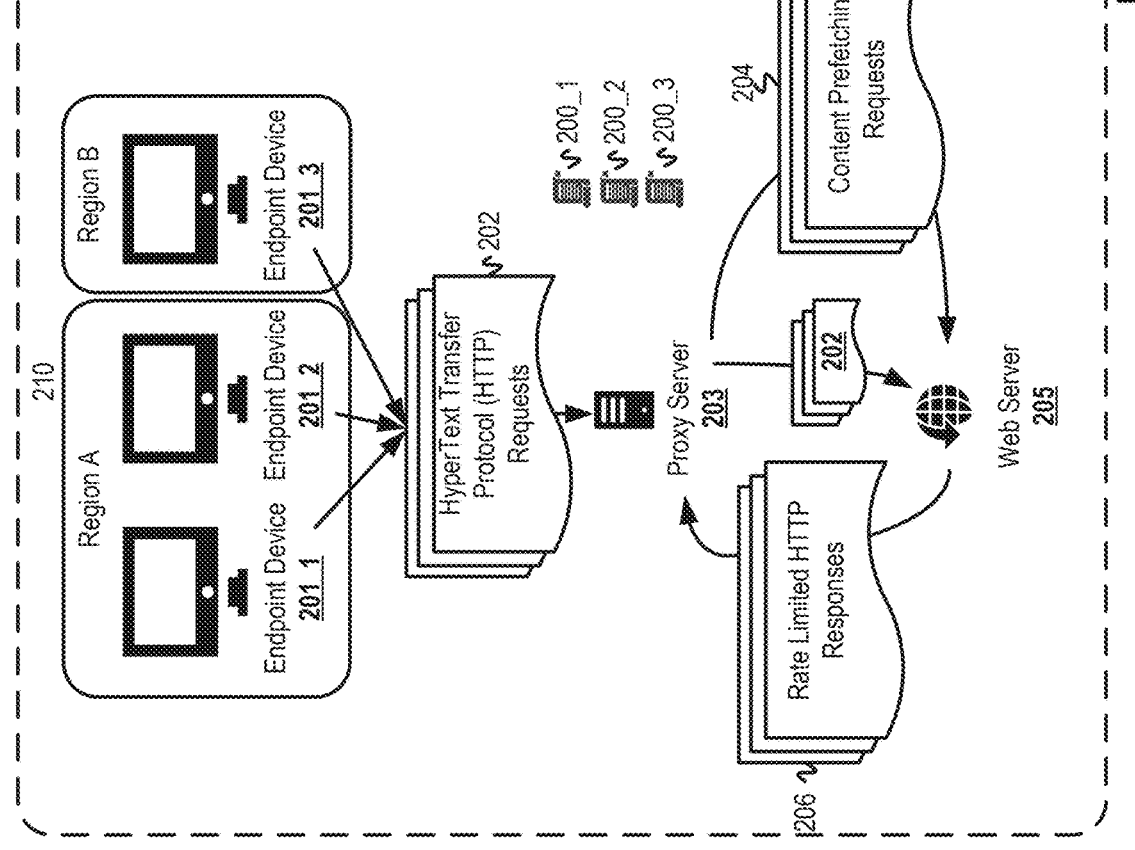
FIG. 2 is a schematic diagram of an example system that maintains behavioral profiles at a proxy server and an example system that maintains behavioral profiles at endpoint devices.

FIG. 2 is a schematic diagram of an example system that maintains behavioral profiles at a proxy server and an example system than maintains behavioral profiles at endpoint devices. An example system 210 comprises a proxy server 203 that maintains behavioral profiles 200_1, 200_2, and 200_3 for endpoint devices 201_1, 201_2, and 201_3, respectively. As the proxy server 203 receives HTTP requests 202 from the endpoint devices 200_1-200_3, the proxy server 203 communicates the HTTP requests 200 to a web server 205 as well as content prefetching requests 204 that are determined based on the behavioral profiles 200_1-200_3. Because the web server 205 sees all of the HTTP requests 200 and content prefetching requests 204 as originating from the same source IP address (i.e., the IP address of the proxy server 203), the web server 205 rate limits corresponding responses (e.g., by returning HTTP responses having 403 HTTP status codes to one or more of the requests 202, 204) as rate limited HTTP responses 206. The proxy server 203 may then suspend prefetching to prevent the rate limiting, impacting latency of user browsing at the endpoint devices 200_1-200_3. Additionally, endpoint devices 201_1 and 201_2 are in region A and endpoint device 201_3 is in region B. Consequently, the endpoint devices 201_1-201_2 may have a different language than the endpoint device 201_3, whereas the rate limited HTTP responses 206 will have a same language (due to being in response to a same source IP address for the proxy server 203); one or more of the endpoint devices 201_1-201_3 will have to identify and resolve these language discrepancies prior to rendering content from the web server 205.

An example system 212 also comprises the endpoint devices 201_1-201_3, the proxy server 203, and the web server 205. By contrast with the example system 210, each of the endpoint devices 201_1-201_3 locally runs the behavioral profiles 200_1-200_3, respectively, for content prefetching. As such, the web server 205 will receive HTTP requests 202_1 and content prefetching requests 204_1 from a source IP address for endpoint device 201_1, HTTP requests 202_2 and content prefetching requests 204_2 from a source IP address for endpoint device 201_2, and HTTP requests 202_3 and content prefetching requests 204_3 from a source IP address for endpoint device 201_3. As a result, the web server 205 will experience less requests from each source IP address for each endpoint device and will reduce rate limiting of HTTP responses. Moreover, each of the HTTP responses 206_1, 206_2, and 206_3 to endpoint devices 201_1, 201_2, and 201_3, respectively, will be in the corresponding languages.

FIGS. 3-6 are flowcharts of example operations. The example operations are described with reference to an endpoint device, a plugin, a proxy server, an extension, a behavioral profile, and a DNS resolver for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for securely browsing a website with reduced latency via local behavioral profiles and content prefetching/caching. The example operations in FIG. 3 assume that the requested website is supported by a CDN (or other organization/distributed network managing content delivery) for improved content delivery via prefetching and caching of website content. Moreover, the example operations assume that the CDN, the website itself, or another entity maintains an extension for the website that comprises a behavioral profile of expected user or application behavior when browsing the website. FIG. 3 depicts the operations at block 302 as occurring at a DNS resolver and the operations at block 306 as occurring at a proxy server. The other operations in FIG. 3 are performed by a plugin at the endpoint device or sub-modules maintained by the plugin (e.g., extensions, behavioral profiles, etc.).

At block 300, a plugin detects a request for a website at an endpoint device. For instance, the plugin can detect the request for the website via a search bar or other interface with a user at the endpoint device (e.g., via a web browser, software-as-a-service (SaaS) application, or other application running on the endpoint device that accesses the Internet). In some embodiments, for applications or other processes accessing the Internet without interfacing with a user, the request may not be from a user or not as a result of an action by a user.

At block 301, the plugin determines whether the endpoint device has an extension for the requested website. For instance, the plugin can search memory with privileged access at the endpoint device that stores extensions for websites that have been previously browsed by a user (or other application). The plugin can search the memory for a top-level domain of the requested website. The privileged access of the memory ensures that behavioral profiles are not accessed by potentially malicious processes running at the endpoint device, and because the extensions are stored at the endpoint device they are not exposed to the Internet and associated cybersecurity risks. If the plugin determines that the endpoint device has an extension for the request website, operational flow skips to block 312. Otherwise, operational flow proceeds to block 302.

At block 302, the DNS resolver identifies a proxy server of the CDN (e.g., an IP address of the proxy server) and the plugin communicates the request to the proxy server. The DNS resolver iteratively queries a hierarchy of nameservers until it reaches a nameserver for a CDN. When the nameserver for the CDN receives a query from the DNS resolver, the CDN nameserver determines an optimal proxy server among its proxy servers for the endpoint devices. Factors that influence choice of the optimal proxy server include geographical proximity to the endpoint device, load balancing and other networking considerations, etc. Once the DNS resolver identifies the IP address for the optimal proxy server, the DNS resolver communicates the IP address for the proxy server to the endpoint device and the endpoint device (or plugin at the endpoint device) communicates the request to the proxy server.

At block 306, the proxy server receives the request, performs a lookup for a web resource storing an extension corresponding to the website indicated in the request, and communicates an HTTP response to the endpoint device indicating whether the lookup was successful and, if the lookup was successful, an IP address or other locator (e.g., an URL or URI) of the web resource storing the extension. The web resource comprises an authoritative entity known to store trustworthy extensions for websites. The proxy server can have an index of identifiers of top-level domains of websites and can search the index for the website indicated in the request from the endpoint device. In some instances, for example when the request from the endpoint device is for a sub-domain of the top-level domain of the website, the lookup can comprise a substring search to determine whether any of the top-level domains in the index are a substring of the URL indicated in the request from the endpoint device. If the lookup at the proxy server is successful, operational flow proceeds to block 308. Otherwise, operational flow proceeds to block 310.

At block 308, the plugin retrieves the extension from the web resource indicated by the HTTP response from the proxy server. The plugin communicates an HTTP request to the web resource that indicates a query for the extension of the website (e.g., according to an application programming interface (API) of the web resource) and the web resource returns the extension for the requested website. In some embodiments, the web resource can comprise storage on a local area network of an organization for the endpoint device, and the request from the plugin can comprise a request over the local area network. Operational flow proceeds to block 312.

At block 310, the plugin retrieves a default website extension for the website. For instance, the plugin can retrieve the default website extension from local memory. The default website extension comprises a default behavioral profile that models generic browsing behavior across all websites and can be generated using aggregated user (or other entity) behavior statistics for websites across a variety of types (e.g., e-commerce, social media, business, blogs, etc.). The default website extension can be maintained by the CDN and periodically communicated to endpoint devices and/or web resources storing website extensions as the default website extension is updated.

At block 312, the plugin loads the extension into an isolated computing environment. The plugin loads the extension into the isolated computing environment to reduce the risk of malicious attacks using behavioral data from attackers that have gained access to the endpoint device. If malicious attackers gain access to behavioral data, then they can predict attack vectors for exploiting this behavior (for instance, by corrupting web pages that users are expected to visit); the isolated computing environment reduces risk of infiltration via these attack vectors.

At block 313, the plugin establishes a connection with the web server for the requested website. Because the plugin is establishing a connection at the endpoint device, there is a reduced chance of rate limiting for prefetching by the plugin because the web server of the website only sees prefetched requests for a source IP address of the endpoint device and not prefetched requests for other endpoint devices managed by a proxy server in a CDN.

At block 314, the plugin browses the website with local content prefetching/caching and maintains/updates the behavioral profile in the extension. Various operations at this block can occur asynchronously/in parallel and can depend on each other. For instance, maintaining/updating behavioral profiles depends on prior web page requests and event data, prefetching/caching of web pages depends on the most recently generated and/or updated behavioral profile and most recent web page requests, etc. These operations and their dependencies are described in greater detail in reference to FIG. 4.

Figure 4:
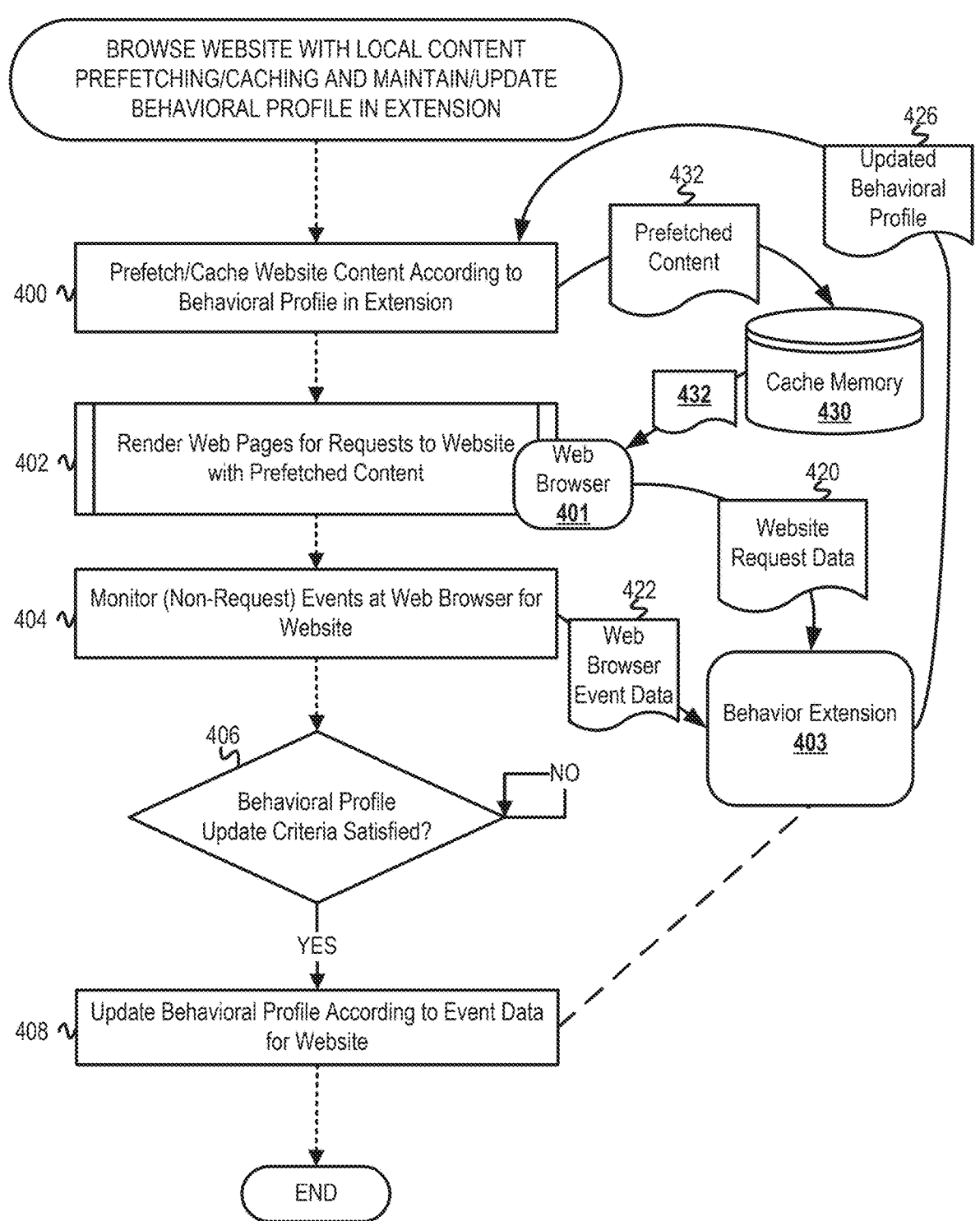
FIG. 4 is a flowchart of example operations for browsing a website with local content prefetching/caching and maintaining/updating a behavioral profile in an extension.

FIG. 4 is a flowchart of example operations for browsing a website with local content prefetching/caching and maintaining/updating a behavioral profile in an extension. Block 400, block 402, block 404, and blocks 406, 408 are separated by dashed lines to indicate that these operations can occur asynchronously and various operations for each delineated block(s) can depend on operations at another delineated block(s) according to various components and data flow depicted in FIG. 4.

At block 400, the plugin prefetches and caches website content according to the behavioral profile in the extension for the website. As the plugin detects events related to browsing of the website such as requested web pages, scrolling events, clicking events, etc., the plugin invokes the behavioral profile on these events in an isolated computing environment. The behavioral profile then outputs web pages of the website to prefetch according to rules-based and machine learning-based models that take indications of the events (e.g., elements that were clicked, scrolling statistics, request web page URLs) as inputs. After the plugin receives prefetched content 432 from prefetching according to the web pages output by the behavioral model, the plugin stores the prefetched content 432 in cache memory 430 for subsequent rendering.

At block 402, the plugin renders web pages for requests to the website with prefetched content. Based on detecting requests to web pages of the website, the plugin searches the cache memory 430 for the prefetched content 432 corresponding to the requested web pages and, if no prefetched content for the requested web pages is available, retrieves the requested content from the web pages via the Internet. The content is then rendered in a web browser 401 and the web browser 401 (or the plugin) communicates website request data 420 indicating the requested web pages to an behavior extension 403 that maintains a behavioral profile for the website. Although block 402 describes the plugin as rendering web pages corresponding to requests to the website, the action performed with prefetched content or content retrieved from the website can vary by implementation. For instance, if a SaaS application or other web-based application is implemented instead of a web browser, that application may not actively render an image or other representation of a web page. Rather, the application may extract data from prefetched content to inform analytics or other functions, and the plugin can facilitate these functions instead based on the prefetched content 432. The operations at block 402 are depicted in greater detail in reference to FIG. 5.

At block 404, the plugin monitors (non-request) events at the web browser for the website. For instance, the plugin can monitor clicking events and scrolling events. These events can be interspersed with web page requests to the website. During the monitoring, the plugin collects web browser event data 422 and communicates the web browser event data 422 to the behavior extension 403 for subsequent updates of the behavioral profile for the website.

At block 406, the plugin determines whether behavioral profile update criteria for the behavior extension 403 is satisfied. For instance, the update criteria can comprise that a session between the endpoint device and the website has been torn down, that a threshold time period has elapsed, that a threshold amount of event data (i.e., the website request data 420 and the web browser event data 422) has been collected, etc. If the update criteria are satisfied, operational flow proceeds to block 408. Otherwise, the plugin continues to check for whether the update criteria are satisfied at block 406.

At block 408, the plugin updates the behavioral profile in the behavior extension 403 according to the event data 420, 422 for the website. For instance, the plugin can additionally train rules-based and machine-learning-based behavior models in the behavioral profile using the event data 420, 422. The updating of the behavioral profile results in updated behavioral profile 426 that is then implemented for operations at block 400 for additional prefetching and caching of website content according to the updated behavioral profile 426.

Figure 5:
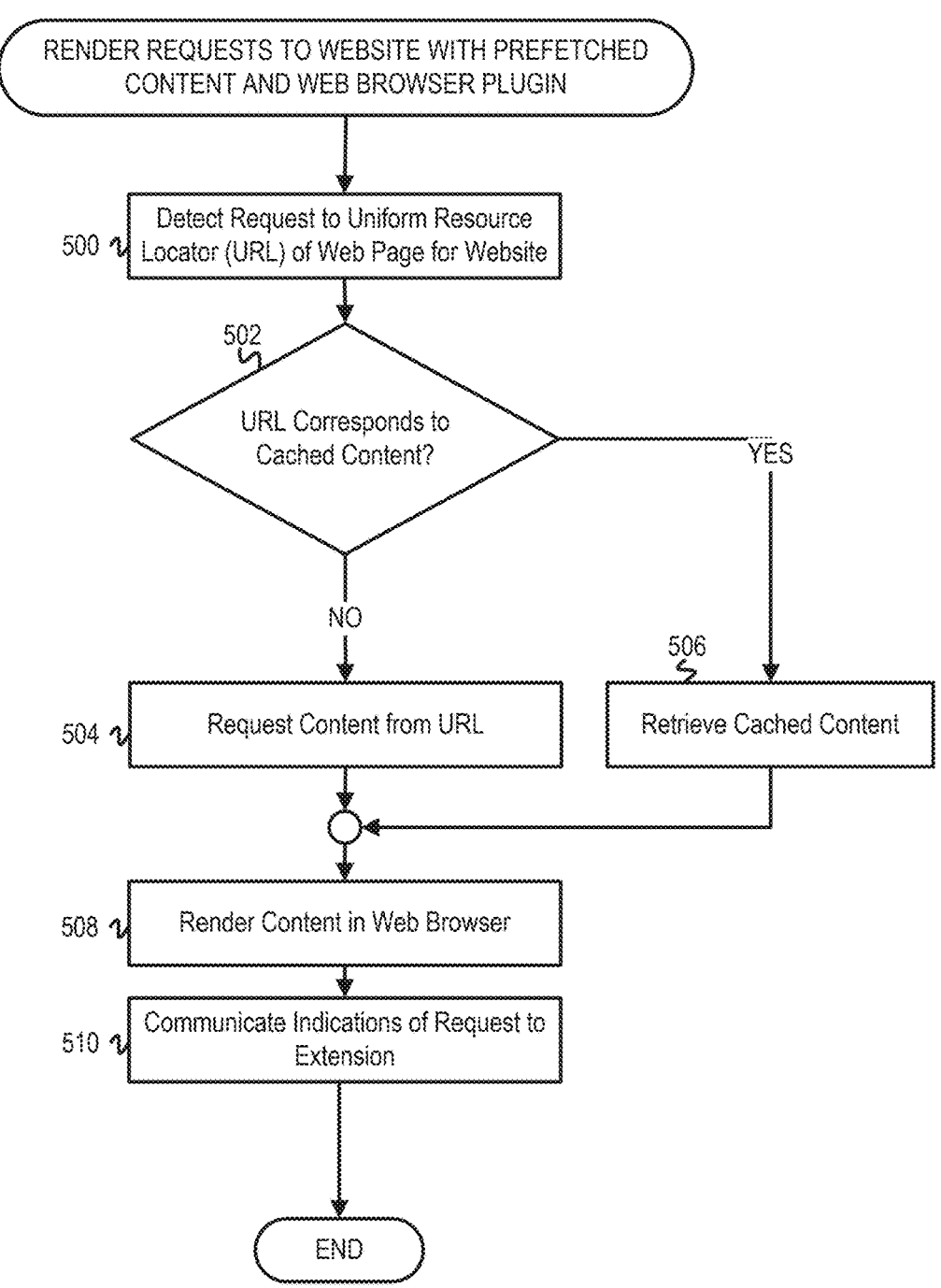
FIG. 5 is a flowchart of example operations for rendering requests to a website with prefetched content and a web browser plugin.

FIG. 5 is a flowchart of example operations for rendering requests to a website with prefetched content and a web browser plugin. At block 500, the plugin detects a request to a URL of a web page for a website. For instance, the plugin can detect the request at a search bar interface of a web browser or based on a click event for a hyperlink HyperText Markup Language (HTML) element in a currently rendered web page in the web browser.

At block 502 the plugin determines whether the URL corresponds to cached content. For instance, the plugin can maintain cache memory that comprises an index of cached URLs and can search for a URL in the detected request against the cached URLs. If the URL corresponds to cached content, operational flow proceeds to block 506. Otherwise, operational flow proceeds to block 504.

At block 504, the plugin requests content from the URL. The plugin communicates an HTTP request to a web server of the website for the URL that indicates the URL and receives an HTTP response that includes the content. Operational flow proceeds to block 508.

At block 506, the plugin retrieves the cached content. For instance, the plugin can retrieve the cached content from an entry of the index in cache memory where the URL was matched.

At block 508, the plugin renders the content in the web browser. In some instances, the plugin can provide the content to the web browser and the web browser then renders the content.

At block 510, the plugin communicates indications of the request to an extension or other module handling updating of a behavior profile for the website. Event data for the request and other event data will subsequently be used to update the behavioral profile.

FIG. 6 is a flowchart of example operations for retrieving an extension from a website with a signed HTTP exchange (SXG) for local content prefetching. Retrieving an extension for a website with an SXG eliminates the latency of requesting the extension from a separate website extension repository or other web resource. Instead, a CDN or other authoritative entity maintains the website extension repository or web resource and the CDN/authoritative entity communicates an SXG to the website that validates authenticity of the extension at the website. Although depicted using SXG, the extension for the website can be retrieved using any protocol (e.g., other certificate-based protocols) that can verify authenticity of the extension.

At block 600, the CDN or other authoritative entity maintains and distributes extensions comprising baseline behavioral profiles for corresponding websites. The CDN or other authoritative entity distributes the extensions to the websites to which they correspond. Block 600 is depicted with a dashed line to indicate that these operations occur independently of the remaining operations in FIG. 6 as the CDN/authoritative entity generates and updates extensions for websites. As an example, the authoritative entity can be a cybersecurity system for endpoint devices accessing the websites.

At block 602, based on detecting a user request to a website at an endpoint device, a plugin at the endpoint device communicates an HTTP request to the origin/destination server for the website. The HTTP request can indicate that the endpoint device is requesting an extension for the website associated with the CDN/authoritative entity. In contrast to previous embodiments, the HTTP request is not routed by to a proxy server of a CDN. This is because the origin/destination server itself provides an SXG comprising a signature that validates the extension for the website. In some instances, the DNS resolver (or other component at the endpoint device) can maintain an index of websites that support extensions with SXGs, and the DNS resolver can indicate routing of HTTP requests directly to the corresponding origin/destination servers rather than to a proxy sever of a CDN when the website in the request matches a website in the index.

At block 604, the plugin receives and validates an SXG in an HTTP response from the origin/destination server. The HTTP response comprises a signature header field for the SXG, and the plugin categorizes the signature as valid or invalid based on validating a public key or certificate that the plugin has received from the CDN/authoritative entity against a URL, response headers, and content contained in the signature header field and/or SXG. In some embodiments, the plugin may retrieve an updated certificate/public key from the CDN/authoritative entity if the previous certificate/public key is expired. Once the plugin confirms that the SXG is valid, the plugin treats the extension as trustworthy and having been communicated directly by the CDN/authoritative entity. If the SXG is invalid, the plugin can attempt to query the CDN/authoritative entity with an indication of the invalid SXG or can proceed with establishing a session with the requested website without local prefetching/caching of content.

At block 606, the plugin loads the extension/behavioral profile corresponding to the SXG from the HTTP response. The plugin loads the extension/behavioral profile in an isolated computing environment to reduce risk of malicious attackers gaining access to behavioral profiles and using behavioral profiles as an attack vector for infiltrating the endpoint device or associated systems.

Variations

The example operations described herein for prefetching website content using a local plugin and extensions with behavioral profiles refer to proxy servers in CDNs that direct the endpoint devices to memory locations to retrieve the extensions. Having a proxy server as part of a CDN for these operations is not necessary. For instance, a repository maintained by an organization of an endpoint device or other entity can communicate a list(s) of supported websites to an endpoint device and a location to retrieve extensions for those websites. The endpoint device can then, when identifying a user request for a website on the list, retrieve the corresponding extension without communicating with any proxy server of a CDN and can begin prefetching/caching website content while a user browses the website. Another example is when websites have signed exchanges that verify authenticity of behavioral profiles that they communicate to endpoint devices (which circumvents proxy servers communicating locations of the behavioral profiles) according to the operations depicted in FIG. 6. Although the above embodiments describe CDNs, substantially similar implementations can occur within software-defined wide area networks (SD-WANs) by replacing proxy servers for CDNs with SD-WAN edges.

The foregoing refers variously to prefetching and caching content from web pages of a website. Alternatively, content can be prefetched from any resources on the Internet that are associated with a website, for instance associated with a website via uniform resource identifiers (URIs), paths of a top-level domain of the website, etc.

Various operations for "maintaining" behavioral profiles can comprise retraining or additionally training associated machine learning models. For instance, when a behavioral profile is a neural network, maintaining the behavioral profile can comprise training the neural network on additional batches of inputs comprising user or application event data when browsing a website. Data for the behavioral profiles includes scrolling events, clicking events, and more generally any interaction with a web browser, for instance hovering over web page elements with a mouse or other interaction with the web browser via peripheral devices.

The foregoing description refers to websites that deliver content using a CDN. Alternatively, websites can deliver content via one or more web servers, for instance one or more web servers orchestrated with a load balancer. The one or more web servers can themselves maintain extensions comprising baseline behavior profile for expected behavior of a user or application browsing the website, or can communicate indications of uniform resource identifiers (URIs) for separate web resources that maintain a baseline behavior profile (potentially with certificates using SXG or related protocols).

Various descriptions herein refer to a plugin prefetching content for web browser and rendering content in web browser corresponding to user requests. Alternatively, the plugins can be built on top of any web-based application that submits requests to the Internet with or without user involvement. The actions taken by the plugin based on responses to these requests may not comprise rendering web pages. For instance, the plugin may use the responses to update analytics or inform/provide other functionality (e.g., chat interfaces, customer analytics, content recommendations, etc.) for the web-based application.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 400, 402, 404, and 406/408 can be performed in parallel or concurrently. With respect to FIG. 5, certain embodiments may not render content in a web browser at block 508. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
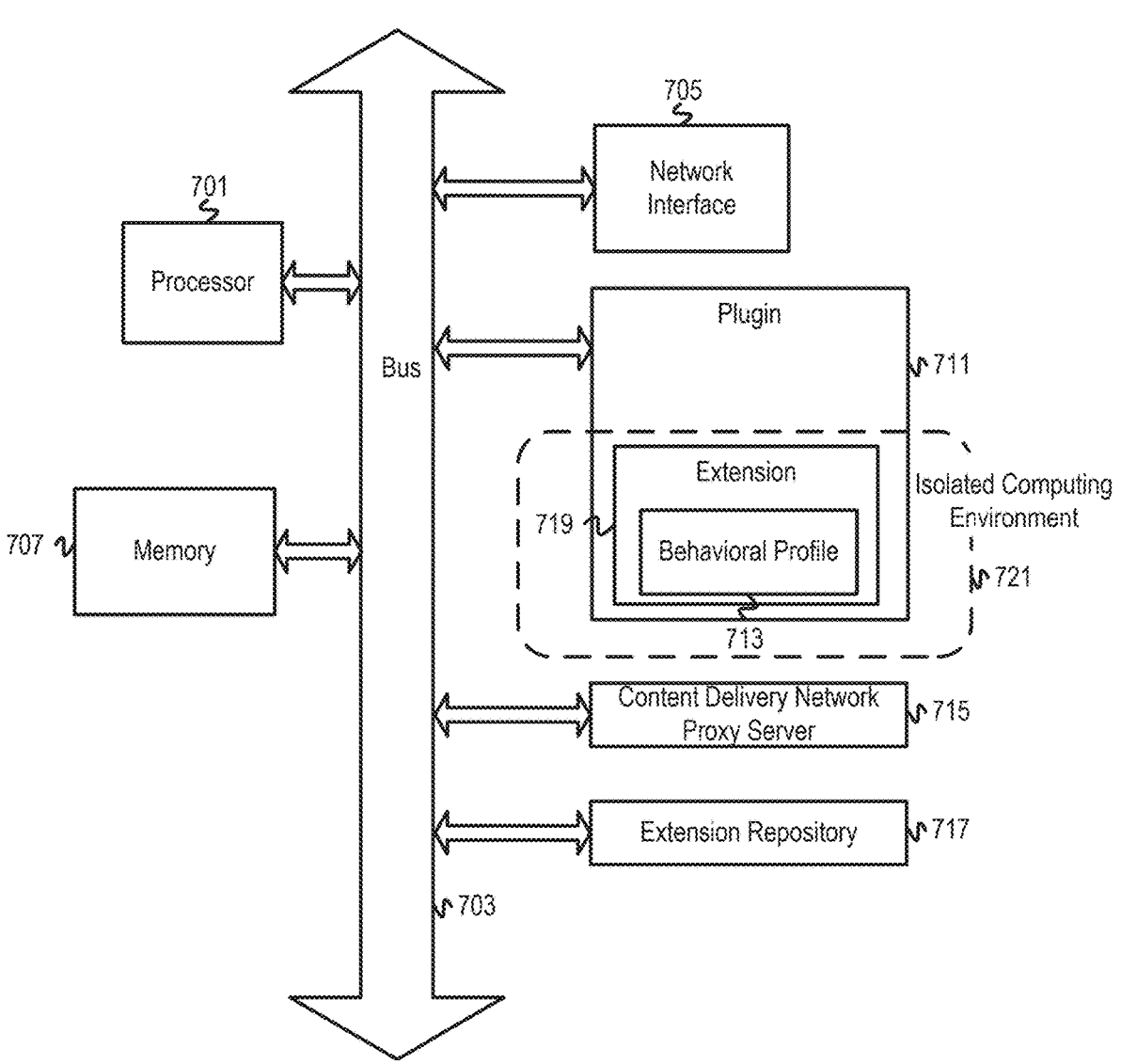
FIG. 7 depicts an example computer system with a plugin managing an extension having a behavioral profile in an isolated computing environment, a CDN proxy server, and an extension repository.

FIG. 7 depicts an example computer system with a plugin managing an extension having a behavioral profile in an isolated computing environment, a CDN proxy server, and an extension repository. The computer system includes a processor 701 (possibly including multiple processors, multiple cores, multiple nodes, and/or implementing multithreading, etc.). The computer system includes memory 707. The memory 707 may be system memory or any one or more of the above already described possible realizations of machine-readable media. The computer system also includes a bus 703 and a network interface 705. The system also includes a plugin 711 that loads and manages an extension 719 for a website having a behavioral profile 713 in an isolated computing environment 721, a CDN proxy server 715, and an extension repository 717. Based on detecting a request from an application (not depicted) managed by the plugin 711 to a website, the plugin 711 determines whether the extension 719 for the website is available in local memory and, if the extension 719 is not available in local memory, retrieves the extension 719 from an authoritative source. The plugin 711 then loads the extension 719 in the isolated computing environment 721. As the plugin 711 detects additional requests to the website by the application, the plugin 711 invokes the behavioral profile 713 on the additional requests and other behavioral data of the application to identify web pages of the website to prefetch and cache. The plugin 711 additionally updates the behavioral profile 713 based on the additional requests and other behavioral data. For the embodiment depicted in FIG. 7, the plugin 711 retrieves the extension 719 from the authoritative source first by communicating a request to the CDN proxy server 715 that returns a locator of the authoritative source—the extension repository 717—and then communicating a request for the extension 719 of the website to the extension repository 717. Although the CDN proxy server 715 and the extension repository 717 are depicted as coupled to the bus 703, the components 715, 717 can be coupled to different computer systems than the plugin 711 and can be computer systems that are communicatively coupled over the Internet. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

The invention claimed is:

1. A method comprising:
based on detecting a request for content a website by an application, retrieving an extension for the website from an authoritative source, wherein the extension comprises a behavioral profile for the website;
loading the extension into an isolated computing environment;
prefetching content from the website based, at least in part, web pages indicated for prefetching by the behavioral profile according to additional requests for web pages of the website by the application;
caching the prefetched content for subsequent use by the application; and
updating the behavioral profile in the isolated computing environment based, at least in part, on the additional requests for web pages of the website by the application and events indicating behavior of at least one of a user of the application and the application during the additional requests.

2. The method of claim 1, wherein the application comprises a web browser, wherein the events indicating behavior of at least one of the user of the application and the application comprise at least one of requested web pages, user scrolling events, user clicking events, and events indicating interaction with the web browser.

3. The method of claim 1, wherein the behavioral profile comprises at least one of a machine learning-based model and a rules-based model that predicts web pages to prefetch for the application.

4. The method of claim 1, further comprising:
communicating the request to a proxy server; and
receiving an indication of the authoritative source from the proxy server.

5. The method of claim 4, wherein the proxy server comprises an edge server in a content delivery network.

6. The method of claim 1, wherein the authoritative source comprises a database of baseline behavioral profiles for websites.

7. The method of claim 1, wherein retrieving the extension from the authoritative source comprises retrieving the extension in a signed HyperText Transfer Protocol exchange communicated from the website.

8. A non-transitory machine-readable medium having program code stored thereon, the program code comprising instructions to:
communicate a request from an application for content from a website;
based on communicating the request, receive an indication of a resource where an extension corresponding to the website is available, wherein the extension comprises a behavioral profile for the website;
retrieve the extension from the resource;
prefetch content from uniform resource identifiers of the website according to the behavioral profile;
cache the prefetched content for subsequent use in the application; and
maintain the behavioral profile in the extension locally and in isolation on an endpoint device running the application according to behavior of at least one of a user of the application and the application, wherein the instructions to maintain the behavioral profile comprise instructions to,
monitor events at the application originating the request; and
update the behavioral profile according to the monitored events.

9. The non-transitory machine-readable medium of claim 8, wherein the instructions to retrieve the extension from the resource comprise instructions to retrieve the extension from the resource using a certificate-based protocol that verifies authenticity of the extension.

10. The non-transitory machine-readable medium of claim 8, wherein the application comprises a web browser, wherein events at the web browser comprise at least one of requested web pages, user scrolling events, and user clicking events.

11. The non-transitory machine-readable medium of claim 8, wherein the behavioral profile comprises at least one of a machine learning-based model and a rules-based model that predicts web pages to prefetch for the application.

12. The non-transitory machine-readable medium of claim 11, wherein the instructions to update the behavioral profile according to the monitored events comprise instructions to at least one of train and additionally train at least one of the machine learning-based model and the rules-based model.

13. The non-transitory machine-readable medium of claim 8, wherein the instructions to receive the indication of the resource where the extension corresponding to the website is available comprise instructions to:
routing the request from the application to a proxy server; and
receiving a response to the request from the proxy server indicating the resource.

14. The non-transitory machine-readable medium of claim 13, wherein the program code further comprises instructions to index a plurality of behavioral profiles for a plurality of websites accumulated from the application interacting with multiple websites, wherein the plurality of behavioral profiles includes the behavioral profile and the multiple websites includes the website.

15. An apparatus comprising:
a processor; and
a machine-readable medium having instructions stored thereon that are executable by the processor to cause the apparatus to,
maintain behavioral profiles for websites for prefetching and locally caching website content, wherein the instructions to maintain the behavioral profiles for websites comprise instructions executable by the processor to cause the apparatus to, based on detecting a request to a website of the websites,
determine whether an extension for the website is stored in local memory;
based on determining that the extension for the website is stored in local memory, retrieve the extension from local memory;
based on determining that the extension for the website is not stored in local memory, retrieve the extension from an authoritative source;
load the extension in an isolated computing environment;

invoke a behavioral profile stored in the loaded extension on additional requests to the website to obtain web pages of the website for prefetching;

prefetch content from the web pages of the website;

cache the prefetched content; and update the behavioral profile in the loaded extension based, at least in part, on the additional requests to the website.

16. The apparatus of claim 15, wherein the request and additional requests to the website comprise requests from an application, wherein the instructions to update the behavioral profile in the loaded extension further comprise instructions executable by the processor to cause the apparatus to update the behavioral profile in the loaded extension based on behavior of at least one of a user of the application and the application during the request and the additional requests.

17. The apparatus of claim 16, wherein the application comprises a web browser, wherein the behavior of at least one of the user of the application and the application comprises behavior indicated by at least one of scrolling events, clicking events in the web browser, and events indicating interaction with the web browser.

18. The apparatus of claim 16, wherein the behavioral profile comprises at least one of a machine learning-based model and a rules-based model that predicts web pages to prefetch for the application.

19. The apparatus of claim 15, wherein the authoritative source comprises a database of baseline behavioral profiles for the websites.

20. The apparatus of claim 15, further comprising storing the extension with the updated behavioral profile in local memory.

* * * * *